(12) United States Patent
Brown et al.

(10) Patent No.: US 7,777,750 B1
(45) Date of Patent: Aug. 17, 2010

(54) TEXTURE ARRAYS IN A GRAPHICS LIBRARY

(75) Inventors: Patrick R. Brown, Raleigh, NC (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 754 days.

(21) Appl. No.: 11/608,767

(22) Filed: Dec. 8, 2006

Related U.S. Application Data (60) Provisional application No. 60/833,978, filed on Jul. 28, 2006.

(51) Int. Cl.
G06T 1/00 (2006.01)
(52) U.S. Cl. .................. 345/522; 345/582; 345/552
(58) Field of Classification Search .................. 345/552
See application file for complete search history.

(56) References Cited

U.S. PATENT DOCUMENTS

| | | | |
|---|---|---|---|
| 5,005,137 A | 4/1991 | Ernst | |
| 5,812,854 A | 9/1998 | Steinmetz et al. | |
| 5,870,097 A | 2/1999 | Snyder et al. | |
| 5,977,977 A | 11/1999 | Kajiya et al. | |
| 6,044,225 A | 3/2000 | Spencer et al. | |
| 6,891,544 B2 | 5/2005 | Oka et al. | |
| 6,982,718 B2 | 1/2006 | Kilgard et al. | |
| 6,983,456 B2 | 1/2006 | Poznanovic et al. | |
| 7,006,101 B1 | 2/2006 | Brown et al. | |
| 7,009,615 B1 | 3/2006 | Kilgard et al. | |
| 7,015,915 B1 | 3/2006 | Diard | |
| 2003/0020741 A1 | 1/2003 | Boland et al. | |
| 2004/0012596 A1 | 1/2004 | Allen et al. | |
| 2004/0158693 A1 | 8/2004 | Dagan et al. | |
| 2004/0169671 A1 | 9/2004 | Aronson et al. | |
| 2005/0243094 A1 | 11/2005 | Patel et al. | |
| 2006/0114260 A1 | 6/2006 | Diard | |

OTHER PUBLICATIONS

"The Official Guide to Learning OpenGL, Version 1.1", Apr. 21, 2005, www.glprogramming.com/red/, reference version acquired from web archive, http://web.archive.org/web/20050421011611/http://www.glprogramming.com/red/chapter09.html.*

(Continued)

*Primary Examiner*—Ulka Chauhan
*Assistant Examiner*—Robert Bader
(74) *Attorney, Agent, or Firm*—Patterson & Sheridan, LLP

(57) ABSTRACT

One embodiment of the invention sets forth a method for storing graphics data in a texture array in a local memory coupled to a graphics processing unit. The method includes the steps of specifying the texture array as a target in the local memory, and loading a first block of texture maps into the texture array, wherein each texture map in the first block has a first resolution and corresponds to a different slice of the texture array. One advantage of the disclosed method is that a complete block of texture images may be loaded into a texture array using a single API call. Thus, compared to prior art systems, where a texture array must be loaded one image for one slice of the array at a time, the disclosed method increases the efficiency of using arrays of texture maps for graphics processing operations.

24 Claims, 5 Drawing Sheets

OTHER PUBLICATIONS

Mark Segal and Kurt Akely, "The OpenGL Graphics System: A Specification", Oct. 22, 2004. Silicon Graphics, Inc., pp. 2, 141-190.*

Simon Green, "The OpenGL Framebuffer Object Extension", Mar. 11, 2005, GDC Presentation, slides 3, 30-32.*

"Cg Toolkit User's Manual", Feb. 2003, NVIDIA, Revision 1.1, pp. 17-18.*

Ian Romanick, "MESAX_texture_stack" specification, GL_MESAX_texture_stack, Version: Dec. 12, 2005, http://oss.sgi.com/projects/ogl-sample/registry/MESAX/texture_stack.txt.

Pat Brown, "ARB_texture_compression" specification, GL_ARB_texture_compression, Version: May 23, 2000, http://oss.sgi.com/projects/ogl-sample/registry/ARB/texture_compression.txt.

Pat Brown, "EXT_texture_compression_s3tc" specification, GL_EXT_texture_compression_s3tc, Version 1.1, Nov. 16, 2001, http://oss.sgi.com/projects/ogl-sample/registry/EXT/texture_compression_s3tc.txt.

Mark J. Kilgard, "NV_texture_shader" specification, GL_NV_texture_shader, Version: May 13, 2004, http://oss.sgi.com/projects/ogl-sample/registry/NV/texture_shader.txt.

Office Action. U.S. Appl. No. 11/565,566 dated Jun. 9, 2009.

* cited by examiner

TEXTURE ARRAYS IN A GRAPHICS LIBRARY

CROSS REFERENCE TO RELATED APPLICATIONS

This application claims priority to the U.S. Provisional Application titled: "API Extensions for Advanced Graphics Processing Units," filed on Jul. 28, 2006 and having U.S. patent application No. 60/833,978.

BACKGROUND OF THE INVENTION

1. Field of the Invention

Embodiments of the present invention generally relate to computer programming using graphics hardware. More specifically, embodiments of the invention relate to defining, loading, and manipulating texture arrays using a graphics library.

2. Description of the Related Art

Graphics processing units (GPUs) are configured to execute instructions that generate images displayed on a display device. Some graphics APIs expose an interface to graphics application developers that consists of a set of calls written in a high-level programming language. To access specific capabilities of a target GPU, developers typically write shader programs for the target GPU in a high-level programming language, such as the OpenGL Shading Language (GLSL). The shader programs are conveyed through the API to driver software that is configured to compile and assemble the shader programs into machine code programs. The machine code programs are then executed on the appropriate GPU processing units, as specified in the original shader program text.

One well-known technique used by graphics hardware is texture mapping, where data stored in graphics memory is mapped to various pixels on vertices being processed in a graphics rendering pipeline. To take advantage of hardware based texture mapping, a developer may specify both the texture to use and how the texture should be applied to each pixel or vertex, enable texture mapping, and then render a scene, supplying both the texture and geometric coordinates of the pixels or vertices. Each of these actions may be invoked using calls provided by the graphics API. Conventional texture mapping has been extremely successful, and nearly every 3D computer game today uses some form of texture mapping. In addition to two-dimensional (2D) texture maps, graphics hardware may also support the use of one-dimensional (1D) texture maps, three-dimensional (3D) texture maps and texture cube maps. Among other things, 3D texture maps have applications in medical imaging and geological analysis, and texture cube maps are useful for rendering an object with reflective surfaces.

While texture mapping has been very successful, and a broad span of graphics hardware provides support for texture maps, some problems have been identified. One issue is that, in some cases, using multiple texture maps to render similar objects is inefficient with conventional processes. Consider, for example, a video game that uses texture mapping to render military uniforms worn by a group of military soldiers. If the uniform for each figure is different, a separate texture is used. Rendering these uniforms requires a developer to load a texture map using an API call, render the geometry of a figure using that texture map, and then repeat this process to render the next figure. This process of separately loading each texture map is quite inefficient and reduces the speed at which the graphics hardware can render the full group of military soldiers. This shortcoming is exacerbated when mipmapping is used, as each mipmap image has to be loaded individually using an API call. Additionally, the use of separate textures requires that application developers incur the overhead of an API call to activate a new texture each time a different type of soldier (or other graphics image) is drawn. Some applications may deal with this problem by accepting the API call overhead. Others may perform the possibly cumbersome step of sorting their scenes by textures used to minimize the number of calls. Still others may merge individual texture images into a single larger texture image and accept the filtering artifacts that result from this approach as neighboring textures bleed together.

As the foregoing illustrates, what is needed in the art is way to load, access, and manipulate texture maps in a graphics library that library avoids one or more of the problems set forth above.

SUMMARY OF THE INVENTION

One embodiment of the invention sets forth a method for storing graphics data in a texture array in a local memory coupled to a graphics processing unit. The method includes the steps of specifying the texture array as a target in the local memory, and loading a first block of texture maps into the texture array, wherein each texture map in the first block has a first resolution and corresponds to a different slice of the texture array.

One advantage of the disclosed method is that a complete block of texture images may be loaded into a texture array using a single API call. Thus, compared to prior art systems, where a texture array must be loaded one image for one slice of the array at a time, the disclosed method increases the efficiency of using arrays of texture maps for graphics processing operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. Note, however, that the appended drawings illustrate only typical embodiments of this invention and are therefore not to be considered limiting of its scope, for the invention may admit to other equally effective embodiments.

DETAILED DESCRIPTION

Embodiments of the invention allow developers of graphics applications to efficiently and effectively manipulate texture arrays using a graphics library. Generally, a texture array is a set of texture images of like format, arranged in layers. From a base image size, a sequence of mipmap reductions may be specified for the each texture map included in a texture array. Each layer of a texture array may be accessed as a single unit in a programmable shader, using a coordinate vector. The coordinate vector specifies which layer (also referred to as a slice) of the texture array to access when performing rendering operations, and each layer of the texture array may be accessed as a distinct texture map. Note, although embodiments of the invention are described herein primarily using exemplary texture arrays of 2D texture maps, one of ordinary skill in the art will readily recognize that the operations described herein for 2D texture arrays may also be used for texture arrays of 1D texture maps, 3D texture maps, texture cube maps, or more generally, texture arrays of texture maps having N dimensions.

The general convention for referencing coordinate locations in an N-dimensional texture map is to use a coordinate vector of N elements, using the letters S, T, R, etc. as needed to reflect the different axes of the reference coordinate frame for the texture map. For example, a location in a 2D texture map may be specified using a coordinate vector having <S, T> components and a 3D texture map may be specified coordinate vector having <S, T, R> components. In one embodiment, existing graphics API support for 3D texture maps may be extended to support a texture array of 2D texture maps. This allows a texture array of 2D texture maps to be loaded, modified, and accessed in rendering operations using the API calls available for 3D texture maps. In such a case, the <S, T, R> values normally used to specify a coordinate location on a 3D texture map, refer to a coordinate location on a 2D texture map of <S, T> and a slice of the texture array <R>. Generally, the S, T values may be supplied in a normalized form having a range of [0 . . . 1], and the R value may be supplied as an integer in the range of [0<R<(# of slices−1)]. To implement this functionality, the API call used to load a 3D texture map may be configured to accept a parameter or token specifying that the object being loaded is in fact an array of 2D texture maps and not a single 3D texture map image. Using the API calls for a 3D texture map leverages the existing mechanisms for loading a 3D texture map for use with an array of 2D texture maps.

Similarly, for a 1D texture array, the API calls conventionally used for a 2D texture map may be configured to support operations for a 1D texture array. Once loaded, shader programs may access the 1D texture maps in the texture array by specifying a coordinate location and a reference to the desired array slice. Thus, when referencing a texture array of 1D texture maps using a coordinate location of <S, T> the S refers to a coordinate of the 1D texture map and the T refers to a slice of the 1D texture array.

Shader programs may invoke texture fetches from a 2D texture map in the 2D texture array using an API call to specify the <S, T, and Slice> coordinate values to use in the texture fetch operation. Additionally, filtering may be performed when texture data in a given slice of the texture array is accessed. For example, bilinear filtering may be used when accessing a 2D texture map. Further, trilinear filtering may be used to interpolate between the results of two different bilinear filtering operations using two sequential mipmaps in a given mipmap chain represented in a slice of the 2D texture array.

As each texture map in the texture array is a separate image, filtering across slices of the texture array would not typically be useful. However, embodiments of the invention may allow updates to be made across multiple slices. Consider again the example of rendering a group of soldiers in a video game. Assume that the video game is configured to render uniforms for different groups of soldiers using the same texture maps, save for items such as button color and insignia to distinguish one player's units from another's. If the buttons on each uniform cover generally the same coordinates of a 2D texture map, then an update for each map of the texture array may be performed using an API call. In effect, the update may cut through each of the texture maps of the texture array and replace a specified region with updated texture data. Thus, rather than loading or modifying each texture map individually, an API call may be used to change the button color for each texture map of a soldier's uniform in the texture array.

In one embodiment, once a texture array is loaded, API calls may be used to generate a set of mipmap reduction images for each slice of the texture array. The mipmap reductions are typically filtered and averaged-down versions of the largest texture map in which each texel in a smaller texture is typically an average of the corresponding four texels in the larger texture. In such a case, all the developer may have to do is specify the target texture array using one API call, and initiate a mipmap generation routine using another. Alternatively, the graphics API may be used to load a set of images for a given level of detail in a mipmap chain for each slice of the texture array. Compared with prior art methods that require the developer to map memory for each slice, copy texture data into the slice, and then repeat this for each slice of the texture array, as well as for each mipmap reduction, embodiments of the invention allow developers to load texture arrays and mipmap chains in a more straightforward and efficient manner. Further, any API commands available to be used with texture maps, such as standard pixel processing algorithms, may be used with a texture array.

Figure 1:
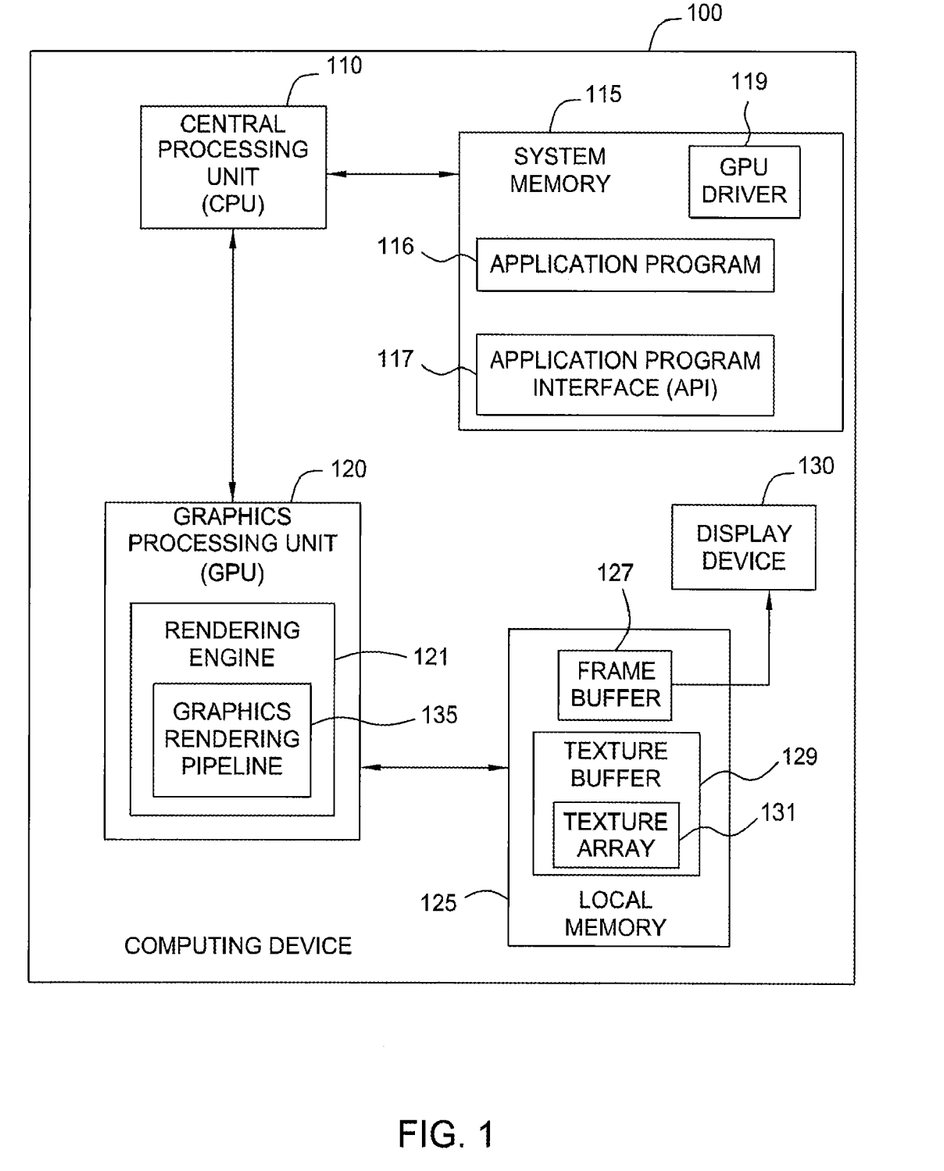
FIG. 1 is a conceptual diagram of a computing device configured to implement one or more aspects of the present invention.

FIG. 1 is a conceptual diagram of a computing device configured to implement one or more aspects of the present invention. As shown, computing device 100 includes, without limitation, a central processing unit (CPU) 110 connected to a system memory 115, a graphics processing unit (GPU) 120 and a local memory 125 coupled to GPU 120 and to a display device 130. GPU 120 includes at least one rendering engine 121 that incorporates at least one graphics rendering pipeline 135 used to process graphics data. System memory 115 includes a GPU driver 119 and an application program interface (API) 117. Generally, GPU driver 119 implements the functions and data structures exposed by API 117 for a given GPU 120.

Application program 116 generates calls to the API 117 in order to produce a desired set of results, typically in the form of a sequence of graphics images. The application program 116 also transmits one or more high-level shading programs to the API 117 for processing within GPU driver 119. The high-level shading programs are typically source code text of high-level programming instructions that are designed to operate on one or more processing units by GPU 120. Additionally, GPU driver 119 and GPU 120 may be configured to execute assembly style shading programs Local memory 125 stores, among other things, a texture buffer 129, and graphics data rendered by GPU 120 in a frame buffer 127. Texture buffer 129 stores data elements typically organized in one-dimensional, two-dimensional or three-dimensional structures, including texture array 131. When graphics rendering pipeline 135 completes a rendering of a display frame, the contents of frame buffer 127 may be output to display device 130 for display. Typically, display device 130 is a CRT or LCD display. Persons skilled in the art will recognize that any system having one or more processing units configured to implement the teachings disclosed herein falls within the scope of the present invention. For example, computing device 100 may be, without limitation, a desk-top computer, a laptop computer, a mobile telephone, a set-top box or a personal digital assistant. Thus, the architecture of computing device 100 in no way limits the scope of the present invention. Further, In alternate embodiments, the CPU 110, GPU 120, the system interface between these processing units (not shown), or any combination thereof, may be integrated into a single processing unit. Further, the functionality of GPU 120 may be included in a chipset of in some other type of special purpose processing unit or co-processor.

Figure 2:
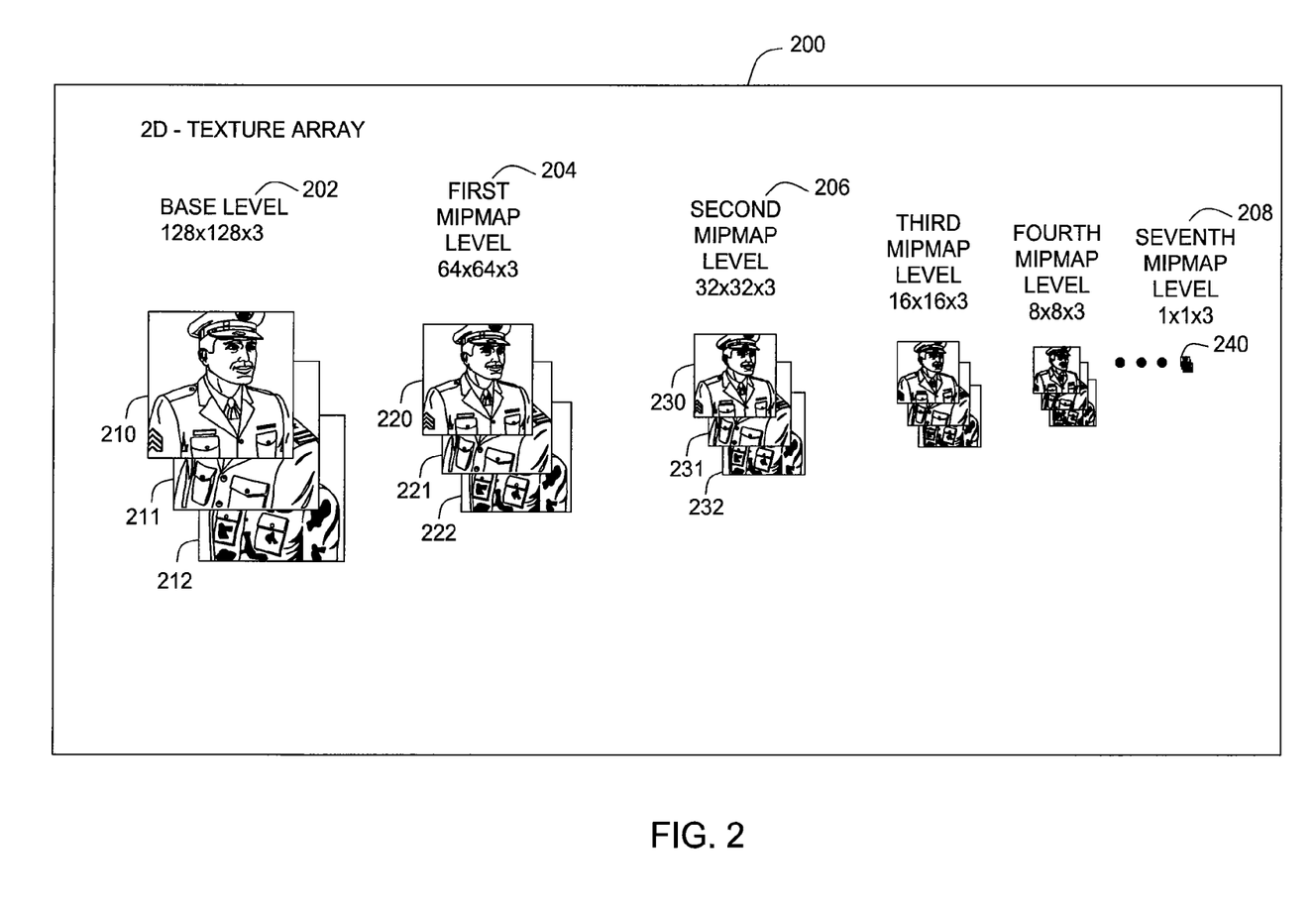
FIG. 2 is a conceptual illustration of a texture array, according to one embodiment of the invention.

FIG. 2 is a conceptual illustration of a texture array 200 of 2D texture maps, according to one embodiment of the invention. As shown, texture array 200 includes three slices, each providing a distinct texture map. A first slice that includes texture map 210, a second slice that includes texture map 211, and a third slice that includes texture map 212. Texture maps 210, 211, and 212 each provide a 128×128 pixel resolution texture map of a different soldier's uniform. Additionally, each slice of texture array 200 includes a mipmap chain generated from 2D texture maps 210, 211, and 212. For example, the first slice of texture array 200 includes a texture map 220 at a first level mipmap 204 having a 64×64 resolution, a texture map 230 at a second mipmap level 206 having a 32×32 resolution, and so on down to a seventh mipmap level 208 having a texture map 240 with a resolution of a single pixel. Similarly, the texture map 211 in the second slice of texture array 200 includes a texture map 221 at the first mipmap level 204 having a 64×64 resolution, a texture map 231 at the second mipmap level 206 having a 32×32 resolution, and so on. Similarly still, the texture map 212 in the third slice of texture array 200 includes a texture map 222 at the first mipmap level 204 having a 64×64 resolution and a texture map 232 at the second mipmap level 206 having a 32×32 resolution and so on.

In one embodiment, the texture data across each slice of texture array 200 at a specific mipmap level may be specified using an API call. Thus, rather than individually loading each of 2D texture maps 210, 211, and 212, each of which having the same resolution, API calls provided by graphics API 117 may be used to load 2D texture maps 210, 211 and 212 as a single block or "brick." In addition to loading different blocks of texture array 200 using an API call, elements of texture array 200 may be updated with data in frame buffer 127 using an API call. For example, a developer may desire to generate a 2D texture map by passing a set of vertex attributes through the pipeline 135 and, ultimately, have the resulting pixels stored in frame buffer saved into a 2D texture map, or portion of a 2D texture map. Accordingly, in one embodiment, an API call may be used to map data from frame buffer 127 into a texture array 200 in texture buffer 129.

To provide graphics API 117, one embodiment of the present invention may be used to extend the OpenGL™ GLSL to incorporate, among other things, 1D and 2D texture array types, tokens to specify that operations normally applied to a 3D texture map should be applied to a 2D texture array, and tokens to specify that operations normally applied to a 2D texture map should be applied to a 1D texture array. Similarly, operations for accessing a 2D texture map may be configured to access a slice of a 2D texture array. A more specific description of the extensions to the OpenGL™ graphics API to support texture arrays is set forth below.

Figure 3:
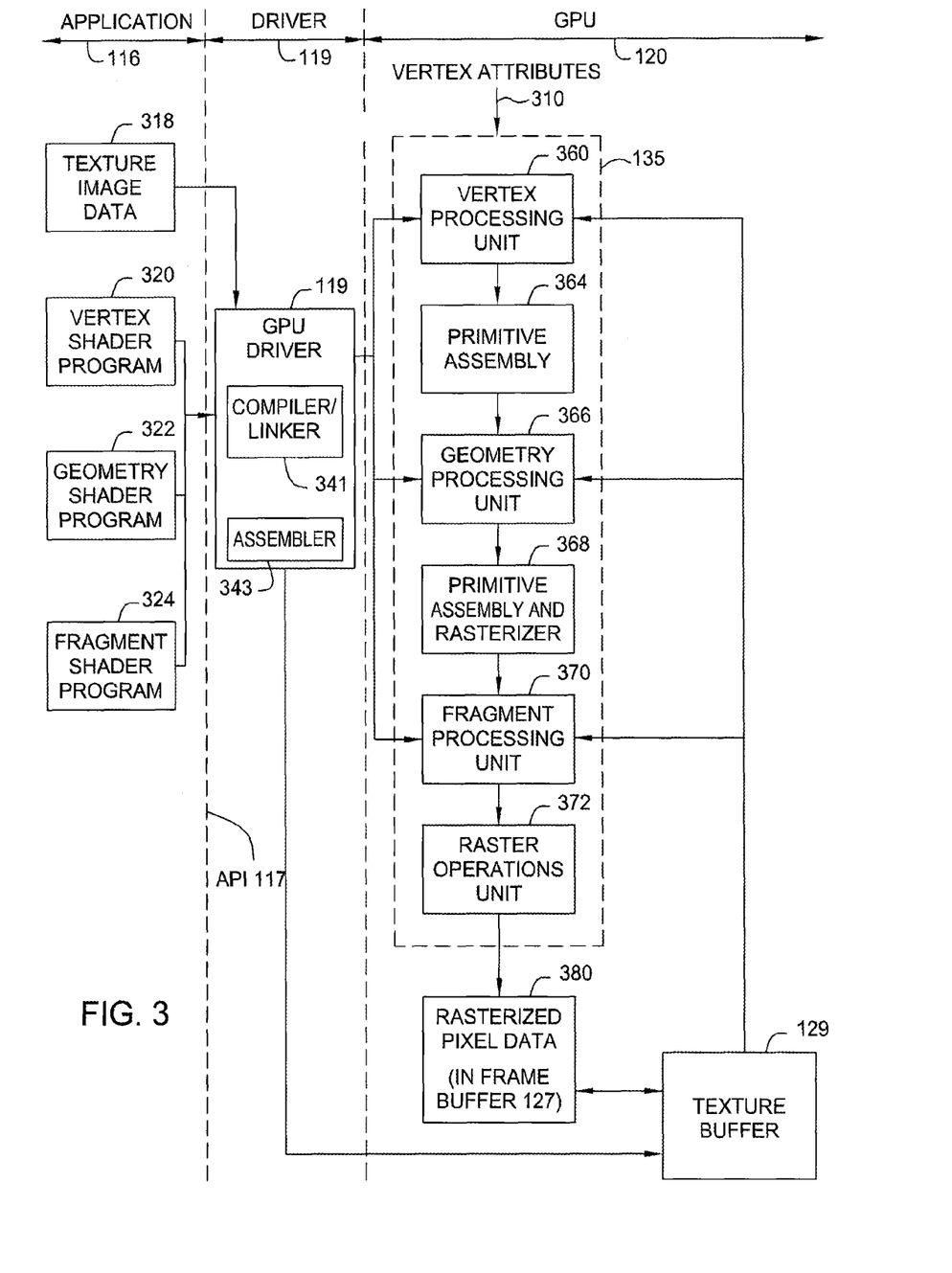
FIG. 3 is a conceptual illustration showing a graphics hardware pipeline in which a texture array of texture maps may be loaded into a texture buffer, according to one embodiment of the invention.

FIG. 3 is a conceptual illustration showing a graphics rendering pipeline 135 in which texture arrays may be loaded into texture buffer 129 within local memory 125 and used for graphics processing operations, according to one embodiment of the invention. Also illustrated are components of application 116, driver 119, and 120. Graphics rendering pipeline 135 includes a vertex processing unit 360, a geometry processing unit 366, a fragment processing unit 370, and a raster operations unit 372. When used to process graphics data to generate display images, vertex attributes 310 flow into the top of the graphics rendering pipeline 135, are processed by the vertex processing unit 360, the geometry processing unit 366, the fragment processing unit 370 and the raster operations unit 372. Generally, the output of graphics rendering pipeline 135 includes a set of rasterized pixel data 380 stored in frame buffer 127 that specifies color and intensity values for pixel positions on display device 130.

Between vertex processing unit 360, geometry processing unit 366 and fragment processing unit 370 are primitive assembly unit 364 and primitive assembly and rasterizer unit 368. The primitive assembly unit 364 is typically a fixed-function unit that receives processed vertex data from vertex processing unit 360 and constructs graphics primitives, e.g., points, lines, triangles, or the like, for processing by geometry processing unit 366. Primitive assembly and rasterizer unit 368, which is optional in various implementations, receives the graphics primitives output by geometry processing unit 366, such as a set of triangles, and perform clipping operations to limit the triangles passed to fragment processing unit 370 to ones that might be viewable on display device 130. The rasterizer receives individual points, lines, or triangles processed by a primitive assembler and converts them into fragments to be processed by the fragment processing unit 370.

As described herein, the processing performed by vertex processing unit 360, geometry processing unit 366, and fragment processing unit 370 may be defined by separate shader programs. Illustratively, FIG. 3 shows a vertex shader program 320, a geometry shader program 322, and a fragment shader program 324. In one embodiment, these shader programs may be written using a high-level shading language, such as the GLSL or Cg shader languages, and transmitted to API 117 for processing within GPU driver 119. The shader programs are then compiled and linked by a compiler/linker 341 included with GPU driver 119 to produce a linked assembly code version of the shader programs. The assembly code is then converted into machine code (also referred to as "microcode") by an assembler 343 also included in GPU driver 119. Alternatively, in some cases, the compiler 341 may generate microcode directly. In any case, the machine code versions of the shader programs are then transmitted to the vertex processing unit 360, the geometry processing unit 366 and the fragment processing unit 370, as the case may be, for execution. When a shader program is executed on the vertex processing unit 360, the geometry processing unit 366, or the fragment processing unit 370, it may execute instructions that read from texture data stored in the texture buffer 129. In alternative embodiments, the vertex shader program 320, the geometry shader program 322 and the fragment shader program 324 may be written in assembly code or may be compiled into assembly code externally to GPU driver 119. In such embodiments, GPU driver 119 would not necessarily include compiler/linker 341, and GPU driver 119 would receive assembly code versions of the shader programs directly. Assembler 343 would then convert the assembly code into machine code and transmit the machine code versions of the shader programs to the appropriate processing units of the graphics rendering pipeline 135, as set forth above.

As also shown, application 116 supplies texture image data 318 to GPU driver 119 using calls to graphics API 117. Generally, texture data 318 includes the texture maps to load into a texture array for graphics rendering. The texture image data, including one or more texture arrays, may be stored in texture buffer 129 and accessed by the different processing units of the graphics rendering pipeline 135 by virtue of the API calls previously described herein.

Figure 4:
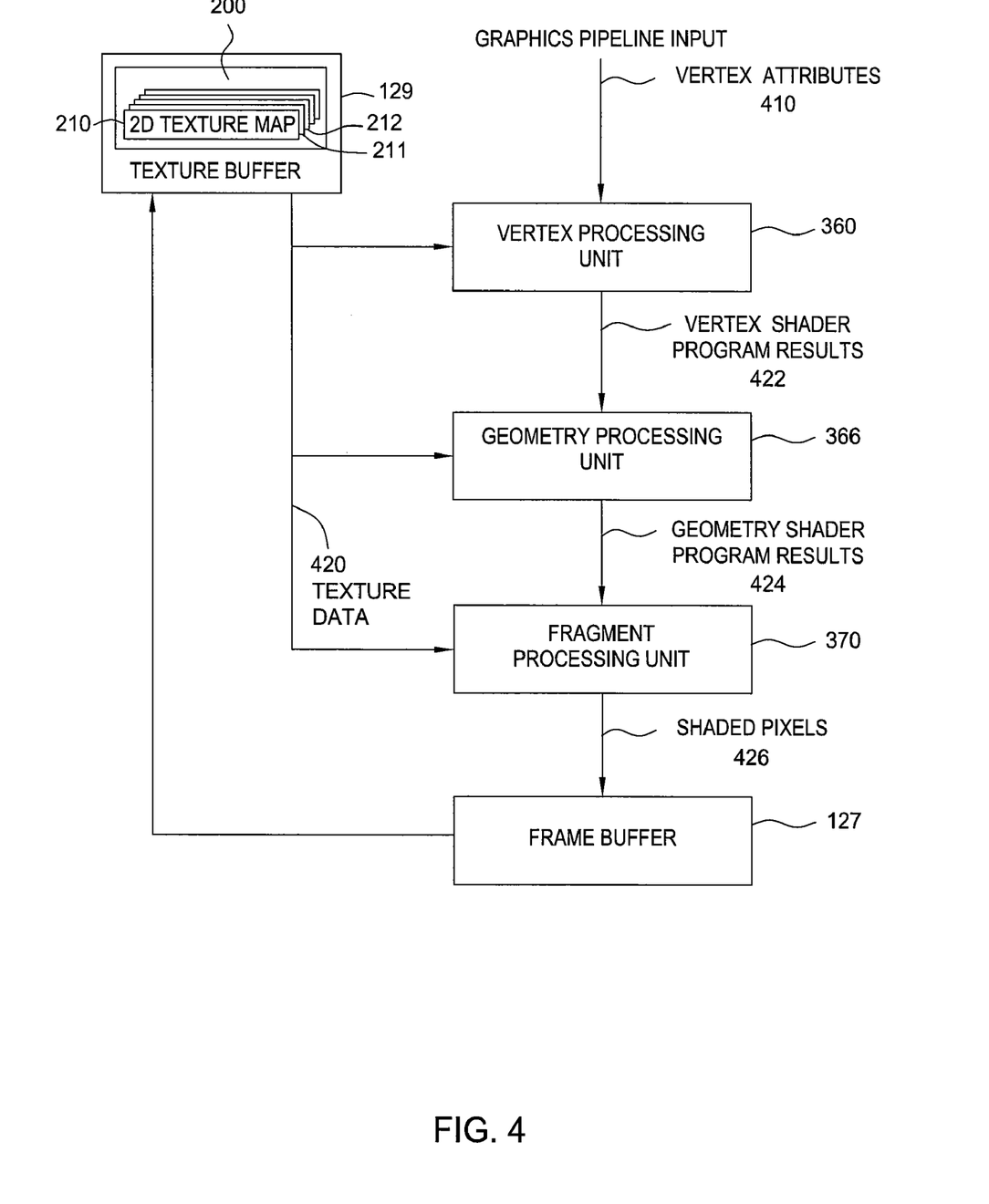
FIG. 4 is a data flow diagram of a programmable graphics pipeline residing within the GPU of FIG. 1, according to one embodiment of the present invention.

FIG. 4 is a data flow diagram of a programmable graphics pipeline residing within the GPU of FIG. 3, according to one embodiment of the present invention. The vertex processing unit 360, the geometry processing unit 366 and the fragment processing unit 372 are configured according to the shader programming model shown in FIG. 3. The vertex processing unit 360 executes the vertex shader program 320 in order to process a stream of vertex attributes 410. Vertex processing unit 360 may access data from additional sources, such as texture data 420 from 2D texture maps 210, 211, and 212 of texture array 200 stored in texture buffer 129. The vertex shader results 422 are transmitted to the geometry processing unit 366, which processes the vertex shader results 422 using geometry shader program 322. The geometry processing unit 366 may access data from additional sources, such as texture data 420 from 2D texture maps 210, 211, and 212 of texture array 200 stored in texture buffer 129. The geometry shader results 424 are transmitted to fragment processing unit 372. The fragment processing unit 372 executes the fragment shader program 324 in order to process the geometry shader results 424. The fragment processing unit 372 may access data from additional sources, such as texture data 420 from 2D texture maps 210, 211, and 212 of texture array 200 stored in texture buffer 129. The output of the fragment processing unit 372 includes a stream of shaded pixels 426 that are written to the frame buffer 127.

Figure 5:
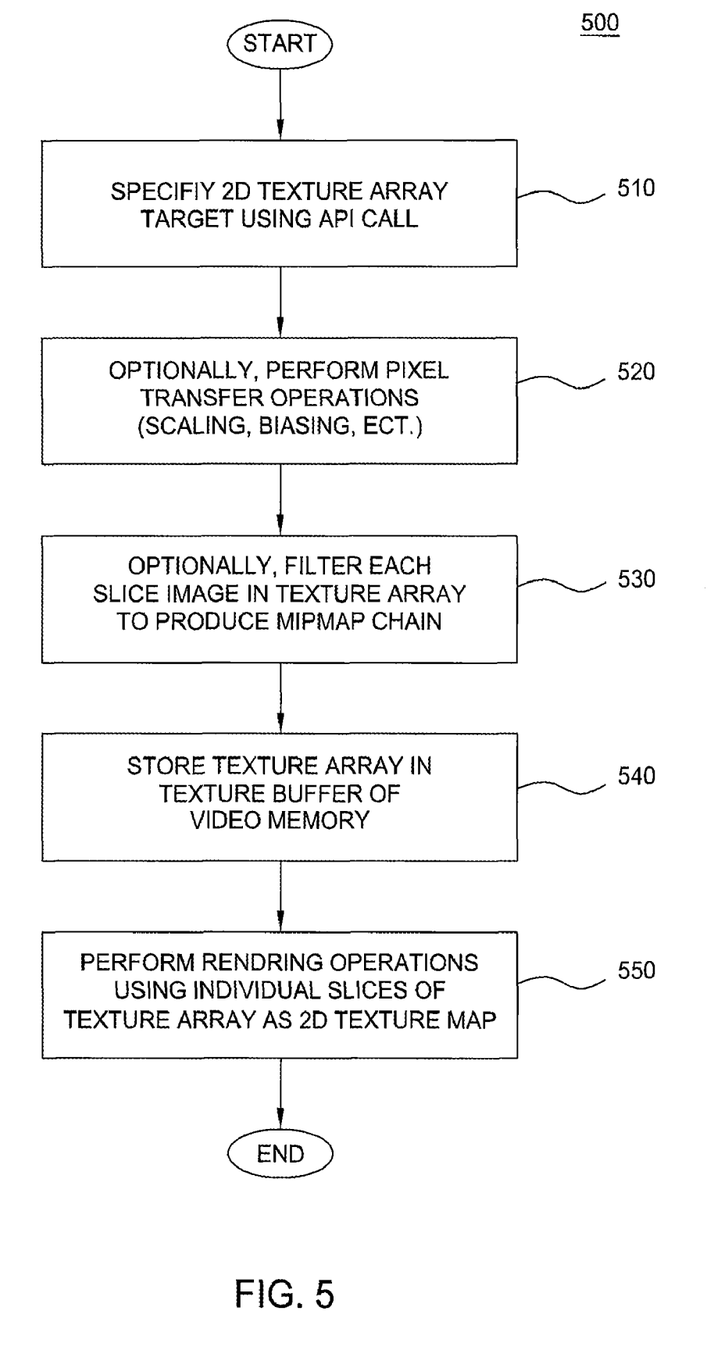
FIG. 5 illustrates is a method for specifying and loading a texture array using a graphics library, according to one embodiment of the invention.

FIG. 5 illustrates is a method 500 for loading a texture array using API calls provided by a graphics library, according to one embodiment of the invention. As shown, the method 500 begins at step where a texture array target is specified using an API call. Once specified, the texture array may be used in rendering operations performed by the graphics pipeline 135.

In one embodiment, an extension to the OpenGL™ graphics API may allow users to specify a set of 2D texture maps to load into a texture array using the glTexImage3D API call. In the OpenGL™ API, the glTexImage3D API call has the following signature:

glTexImage3D (
  target, //Set to GL_TEXTURE_2D_ARRAY_EXT for texture arrays
  level, //Level-of-detail number, Level 0 is the base image level //Level n is the $n^{th}$ mipmap reduction image
  format, //Specifies the number of color components in each texture
  width, //Specifies the width of each texture image
  height, //Specifies the height of each texture image
  depth, //Specifies how many texture maps are present in the //2D texture array
  border, //Specifies the width of the border, if present
  format, //Specifies the format of the pixel data
  type, //Specifies the data type of the pixel data.
  pixels); //Specifies a pointer to the image data in system memory The <target> parameter specifies either a GL_TEXTURE_3D or GL_PROXY_TEXTURE_3D target. In order to extend the OpenGL API to provide support for texture arrays, embodiments of the invention provide an extension to the glTexImage3D API call that allows the target of glTexImage3D to be set to GL_TEXTURE_2D_ARRAY_EXT. This new target indicates to the driver 119 that the data specified in the call to glTexImage3D describes a texture array of 2D texture maps.

Additionally, instead of providing the <depth> parameter specifying the pixel depth of a 3D texture map, the <depth> parameter may be replaced with a <slices> parameter specifying the number of different texture map chains in the 2D texture array. Importantly, the extensions to the API allow a developer to use the glTexImage3D API call to load a block or brick texture maps having the size specified by the <width> and <height> parameters.

Similarly, for a 1D texture array, the OpenGL™ API call glTexImage2D may be extended to accept a target of GL_TEXTURE_1D_ARRAY_EXT. This new target tells the driver 119 that the data specified in the call to glTexImage2D describes a texture array of 1D texture maps.

At step 520, transfer operations may be performed on the image data specified at step 510. For example, pixel transfer operations may be performed on the data referenced by the <pixel> pointer parameter of the glTexImage3D API call. In one embodiment, a pixel transfer path present in the GPU driver 119 may be configured using functions provided by the OpenGL graphics library to perform scale, bias, convolution operations and/or data conversions such as color conversion, or floating point to fixed point format conversions on the data specified in the call to glTexImage3D. Thus, during image specification (at step 510) image processing may also occur. Additional aspects of pixel transfer operations that may be performed when specifying texture maps are discussed in a commonly owned U.S. patent application titled: "A 3D Graphics API Extension for Specifying Compressed Textures through a Pixel Processing Pipeline," filed on Nov. 14, 2006 and having Ser. No. 11/559,561. This related patent application is incorporated by reference herein in its entirety.

At step 530, mipmap reductions may be specified and generated for each of the texture maps in the block of texture maps specified at step 510. For example, the texture maps specified in the call to glTexImage3D may be filtered to generate mipmap chains for each slice of the texture array. Each mipmap chain includes all sizes of a texture map in powers of 2 between the largest size and a 1×1 map. Alternatively, by invoking successive calls to glTexImage3D, each call specifying a different mipmap level of detail for the <level> parameter, a complete texture array may loaded in the number of calls normally required for a mipmap chain.

As another alternative, API calls may be provided for the automatic generation and/or update of mipmap images. As described, at steps 510 and 520, application 116 creates the a base set of images using the glTexImage3D call. For example, API 117 may provide calls that allow application 116 to direct GPU driver 119 to automatically generate mipmaps. For example, an extension to the OpenGL™ graphics API may be defined as follows:

glTexParameteri(GL_TEXTURE_2D_ARRAY_EXT, GL_GENERATE_MIP MAP, GL_TRUE);

This call directs GPU driver 119 to automatically generate mipmaps whenever the base (level 0) image is updated by application 116. Similarly, another extension to the API OpenGL call may be defined as follows:

glGenerateMipmapEXT(GL_TEXTURE_2D_ARRAY_EXT);

This call directs the driver to generate mipmaps based on the current base image. Unlike the glTexParameteri(...) method, the glGenerateMipmapEXT(...) method does not continually update the mipmaps as the base image changes.

At step 540, the GPU driver 119 stores the texture array in a texture buffer 129 in local memory 125. At step 550, the texture data in the texture array 131 is read from buffer 129 and used during shading operations. In addition to being used during graphics processing operations such as texel fetching operations, once specified, texture arrays can themselves be rendered to by binding them to the frame buffer. For example, a single slice of the texture array may be bound using normal frame buffer object mechanisms provided by the OpenGL™ graphics API, or an entire texture array may be bound and rendered to using the layered rendering mechanisms provided by known extensions available for the OpenGL™ API 117.

Additionally, the image data for one of the texture maps at a given slice in the texture array may be updated using an API call. For example, the OpenGL™ graphics API call of glTexSubImage3D may be extended to allow updates to one or more 2D texture maps present in an a texture array The glTexsubImage3D API call has the following signature:

glTexSubImage3D
 (target, //Specifies the target texture. GL_TEXTURE_
   2D_ARRAY_EXT //for an array of 2D texture maps
 level, //Specifies the level-of-detail number Level 0 is the base image //level. Level n is the $n^{th}$ mipmap reduction image.
 xstart, //Specifies a texel offset in the x direction within the texture map.
 ystart, //Specifies a texel offset in the y direction within the texture map.
 slicestart, //Specifies which slice of the texture array to update.
 x, y //Specifies the window coordinates of the lower left corner of the //rectangular region of pixels to be copied
 width, //Specifies the width of the texture subimage.
 height)//Specifies the height of the texture subimage
 slices //Specifies the number of slices, beginning from slice start, to //update
 format, //Specifies the format of the pixel data
 type, //Specifies the data type of the pixel data.
 pixels); //Specifies a pointer to the image data in system memory As extended, the <target> parameter of GL_TEXTURE_2D_ARRAY_EXT may be used to specify that the parameters passed in a call to glTexSubImage3D refer to a texture array of 2D texture maps, instead of a conventional 3D texture image. The <level> parameter specifies which mipmap level is being updated. The <xstart> and <ystart> parameters specify a texel offset within that mipmap level. The <slicestart> parameter specifies an index into the texture array and the <slices> parameter provides an integer count of how many slices to update using the data referenced by the <pixel> pointer. If the <slices> parameter is set to "1" then only the slice specified by <slicestart> is updated. However, multiple slices may be updated simultaneously using the glTexSubImage3D call to refer to a range of slices.

Similarly, for a 1D texture array, the OpenGL™ API call glTexSubImage2D may be extended to accept a target of GL_TEXTURE_1D_ARRAY_EXT. This new target tells the GPU driver 119 that the data specified in the call to glTexSubImage2D describes a texture array of 1D texture maps.

As described, the glTexSubImage3D call is used to update the image data stored by a texture array. The actual data used to update the texture array is specified by the <pixels> parameter, a pointer referencing a region in system memory 115. Additionally, updates to a texture array may be made using pixel data stored in frame buffer 127. For example, the OpenGL™ graphics API call of glCopyTexImage3D may be extended to allow updates to one or more 2D texture maps present in an a texture array The glCopyTexImage3D API call has the following signature:

void glCopyTexSubImage3D(
 (target, //Specifies the target texture. GL_TEXTURE_
   2D_ARRAY_EXT //for an array of 2D texture maps
 level, //level-of-detail number Level 0 is the base image //level. Level n is the $n^{th}$ mipmap reduction image.
 x, //Specifies a texel offset in the x direction within the texture map
 y, //Specifies a texel offset in the y direction within the texture map.
 slices //Specifies which slice of if the texture array to update //with data from the frame buffer
 width, //Specifies the width of the texture subimage.
 height) //Specifies the height of the texture subimage As extended, the <target> parameter of GL_TEXTURE_2D_ARRAY_EXT may be used to specify that the parameters passed in a call to glCopyTexSubImage3D refer to a texture array of 2D texture maps, instead of not a conventional 3D texture image. The <level> parameter specifies which mipmap level is being updated. The <xstart> and <ystart> parameters specify a texel offset within that mipmap level. The <slices> parameter provides an integer count of how many slices to update using the data from the frame buffer 127.

Similarly, for a 1D texture array, the OpenGL™ API call glCopyTexSubImage2D may be extended to accept a target of GL_TEXTURE_1D_ARRAY_EXT. This new target tells the GPU driver 119 that the data specified in the call to glCopyTexSubImage2D describes an update to a slice of a texture of 1D texture maps using data frame buffer 127. The manual and automatic mipmap generation methods discussed above may be used to update to images that have been edited by any of the sub-image update mechanisms.

In sum, embodiments of the invention provide support for manipulating texture arrays in a graphics library. In particular, the functionality of API calls used to process a 3D texture map may be extended to also process a 2D texture array. Similarly, API calls used to process a 2D texture map is extended to also process a 1D texture array. One of ordinary skill in the art will recognize that the teachings of the present invention may be adapted for use with texture arrays storing texture maps of N dimensions.

One new processing capability enabled by these features for processing a texture array using a graphics liberally allows a developer to specify a complete block or brick of texture images to load into a texture array using an API call. Compared to prior art systems, where a texture array must be loaded one image for one slice of the array at a time, embodiments of the present invention improve the efficiency of using arrays of texture maps for graphics processing operations.

While the foregoing is directed to embodiments of the present invention, other and further embodiments of the invention may be devised without departing from the basic scope thereof, and the scope thereof is determined by the claims that follow.

We claim:

1. A method for storing graphics data in a texture array in a local memory coupled to a graphics processing unit, the method comprising:
 specifying the texture array as a target in the local memory coupled to the graphics processing unit; and
 loading a first block of texture maps into the texture array, wherein each texture map in the first block has a first resolution and corresponds to a different slice of the texture array, and wherein each texture map of the texture array is accessible as a single unit in a programmable shader unit of the graphics processing unit when performing rendering operations.

2. The method of claim 1, wherein the texture array is specified as an array of two-dimensional texture maps.

3. The method of claim 1, wherein the texture array is specified as an array of one-dimensional texture maps.

4. The method of claim 1, wherein the texture array is specified as an array of three-dimensional texture maps or as an array of cube maps.

5. The method of claim 1, further comprising the step of loading a second block of texture maps into the texture array, wherein each texture map in the second block has a second resolution and resides in the same slice as a different one of the texture maps in the first block.

6. The method claim 1, further comprising the step of generating a set of mipmaps for each slice of the texture array, wherein each set of mipmaps is based on a different one of the texture maps in the first block.

7. The method of claim 6, further comprising the step of modifying at least one texel in one or more mipmaps, wherein each of the one or more mipmaps belongs to a different slice of the texture array, and all of the one or more mipmaps have the same resolution.

8. The method of claim 1, wherein the step of loading includes processing the first block of texture maps in a pixel transfer path and then writing the first block of texture maps into the texture array.

9. The method of claim 1, further comprising the steps of binding a first slice of the texture map to a frame buffer within the local memory so that one or more rendered pixels from a graphics rendering pipeline within the graphics processing unit may be written to the first slice.

10. A non-transitory computer-readable medium including a set of instructions that when executed by a processor cause the processor to store graphics data in a texture array in a local memory coupled to a graphics processing unit, by performing the steps of:

specifying the texture array as a target in the local memory; and loading a first block of texture maps into the texture array, wherein each texture map in the first block has a first resolution and corresponds to a different slice of the texture array, and wherein each texture map of the texture array is accessible as a single unit in a programmable shader unit of the graphics processing unit when performing rendering operations.

11. A computing device configured to store graphics data in a texture array, the computing device comprising:

a graphics processing unit;

a local memory coupled to the graphics processing unit; and a software driver configured to:

specify the texture array as a target in the local memory; and load a first block of texture maps into the texture array, wherein each texture map in the first block has a first resolution and corresponds to a different slice of the texture array and wherein each texture map of the texture array is accessible as a single unit in a programmable shader unit of the graphics processing unit when performing rendering operations.

12. The computing device of claim 11, wherein the texture array is specified as an array of two-dimensional texture maps.

13. The computing device of claim 11, wherein the texture array is specified as an array of one-dimensional texture maps.

14. The computing device of claim 11, wherein the texture array is specified as an array of three-dimensional texture maps or as an array of cube maps.

15. The computing device of claim 11, wherein the software driver is further configured to load a second block of texture maps into the texture array, wherein each texture map in the second block has a second resolution and resides in the same slice as a different one of the texture maps in the first block.

16. The computing device claim 11, wherein the software driver is further configured to generate a set of mipmaps for each slice of the texture array, wherein each set of mipmaps is based on a different one of the texture maps in the first block.

17. The computing device of claim 16, wherein the software driver is further configured to modify at least one texel in one or more mipmaps, wherein each of the one or more mipmaps belongs to a different slice of the texture array, and all of the one or more mipmaps have the same resolution.

18. The computing device of claim 11, wherein the software driver includes a pixel transfer path, and the software driver loads the first block of texture maps by processing the first block of texture maps in the pixel transfer path and then writing the first block of texture maps into the texture array.

19. The computing device of claim 11, wherein the software driver is further configured to bind a first slice of the texture map to a frame buffer within the local memory, enabling one or more rendered pixels from a graphics rendering pipeline within the graphics processing unit to be written to the first slice.

20. The computing device of claim 11, wherein the software driver includes a programming interface based on the OpenGL graphics system.

21. A method for storing graphics data in a texture array in a local memory coupled to a graphics processing unit, the method comprising:

specifying the texture array as a target in the local memory; and processing a first block of texture maps in a pixel transfer path; and loading the first block of texture maps into the texture array, wherein each texture map in the first block has a first resolution and corresponds to a different slice of the texture array, and wherein each texture map of the texture array is accessible as a single unit in a programmable shader unit of the graphics processing unit when performing rendering operations.

22. The method of claim 21, wherein the texture array is specified as an array of two-dimensional texture maps.

23. The method of claim 21, further comprising the step of loading a second block of texture maps into the texture array, wherein each texture map in the second block has a second resolution and resides in the same slice as a different one of the texture maps in the first block.

24. The method claim 21, further comprising the step of generating a set of mipmaps for each slice of the texture array, wherein each set of mipmaps is based on a different one of the texture maps in the first block.

* * * * *